INVENTOR.
SIEGFRIED R. HOH

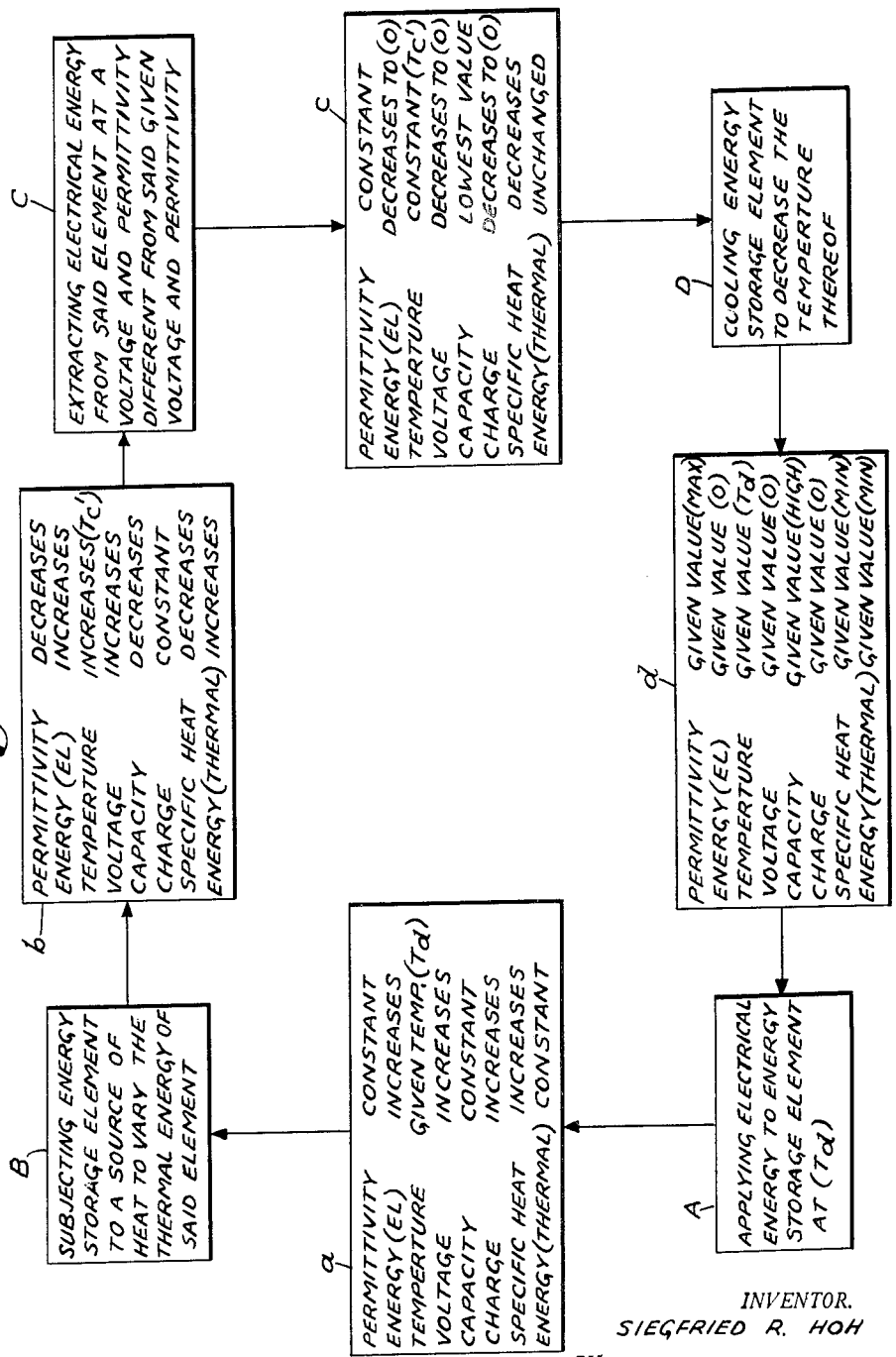

March 29, 1966 S. R. HOH 3,243,687
ENERGY CONVERTER
Filed Feb. 3, 1960 8 Sheets-Sheet 3
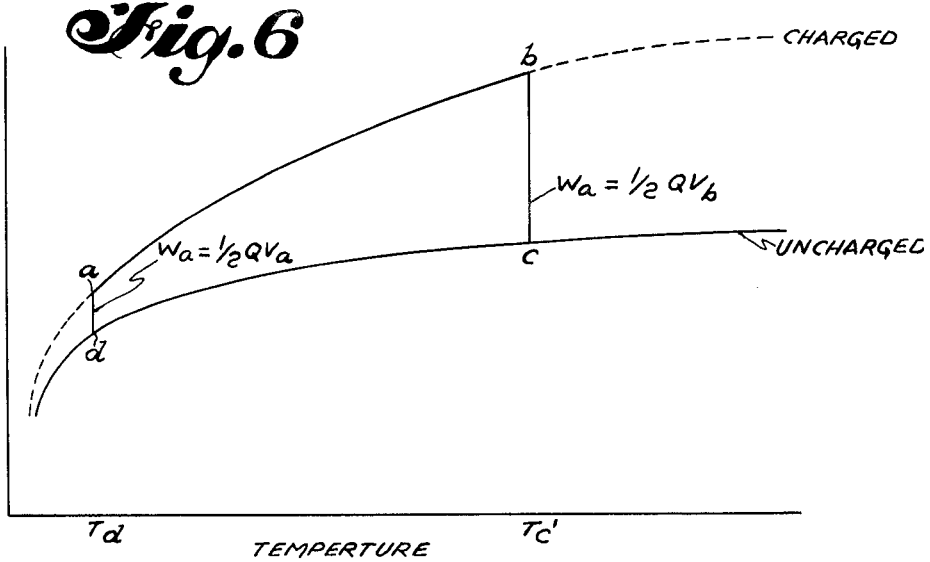
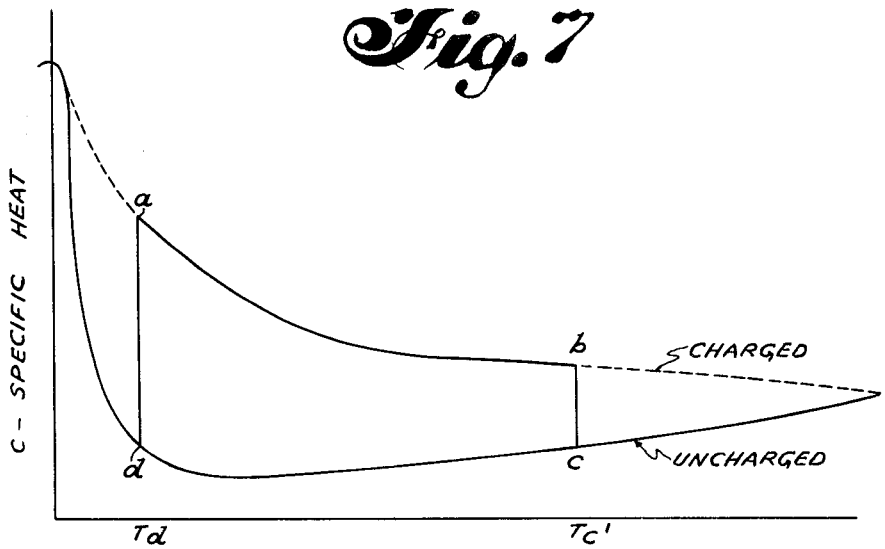
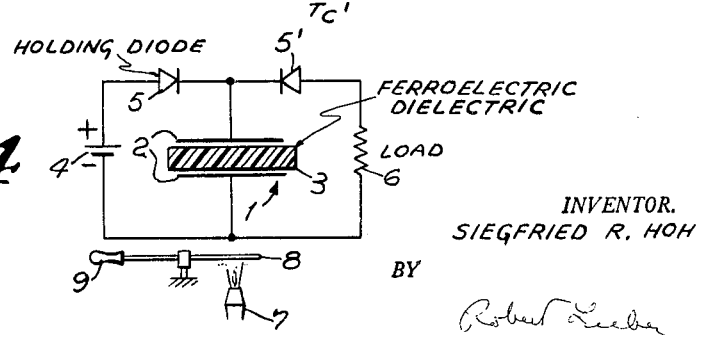
INVENTOR.
SIEGFRIED R. HOH
BY
ATTORNEY

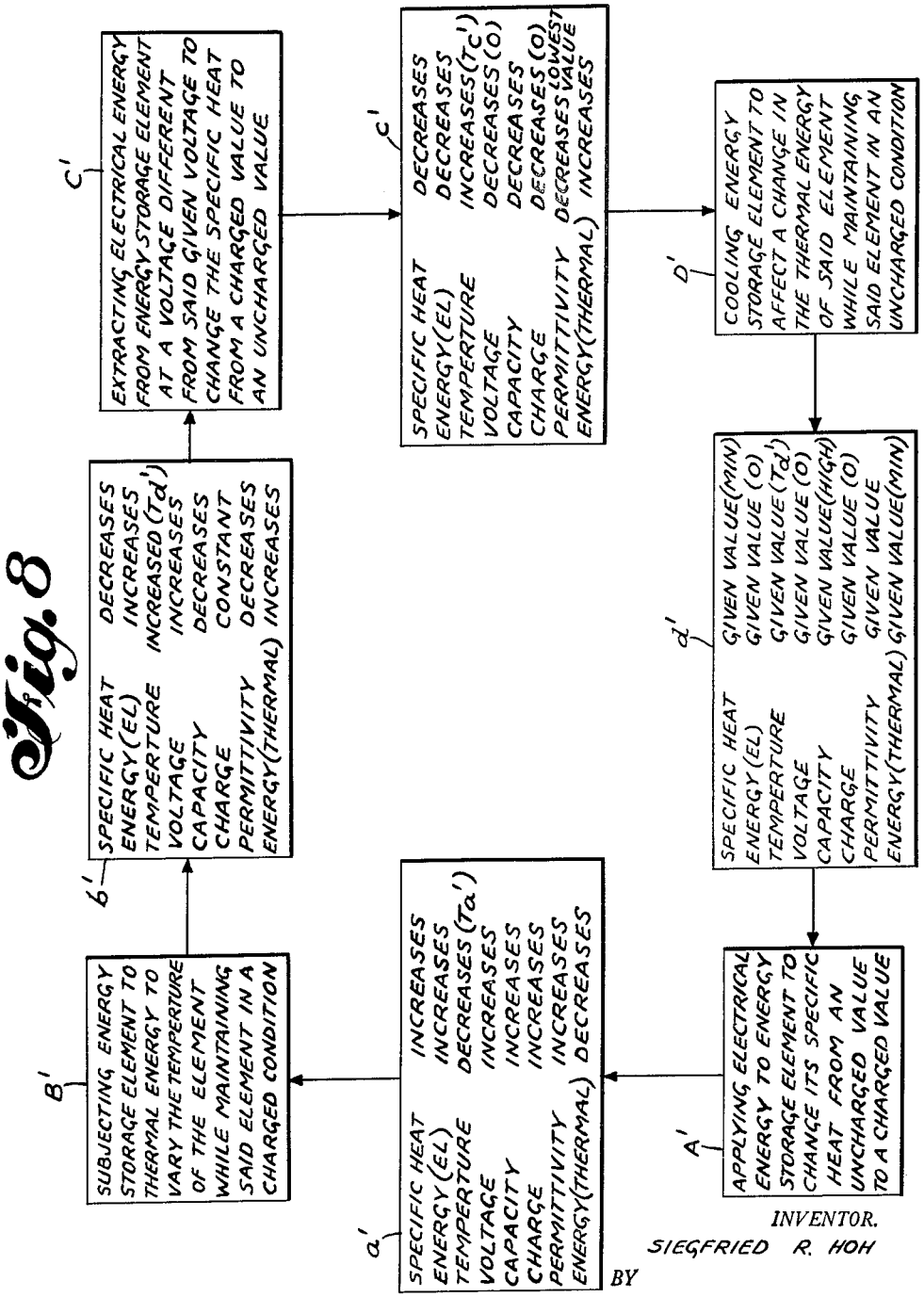

March 29, 1966 S. R. HOH 3,243,687
ENERGY CONVERTER
Filed Feb. 3, 1960 8 Sheets-Sheet 5

INVENTOR.
SIEGFRIED R. HOH
BY
Robert Lieber
ATTORNEY

March 29, 1966  S. R. HOH  3,243,687
ENERGY CONVERTER
Filed Feb. 3, 1960  8 Sheets-Sheet 6
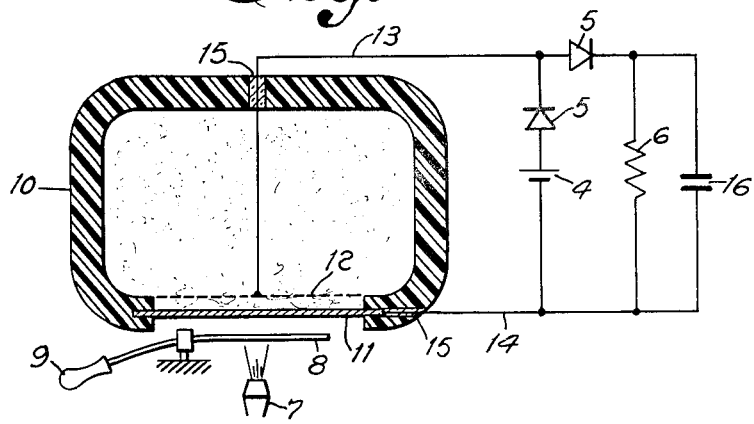
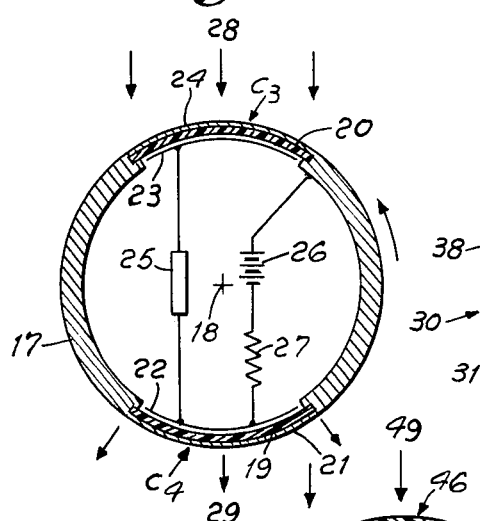
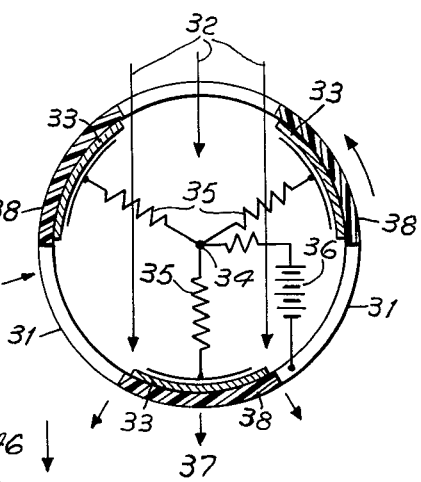
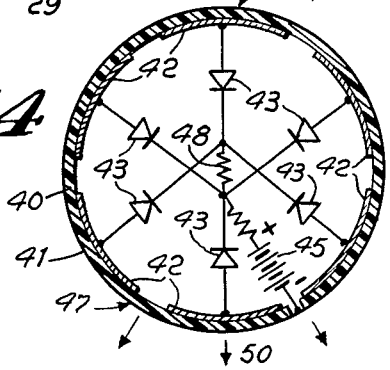
INVENTOR.
SIEGFRIED R. HOH
BY
Robert Lieber
ATTORNEY March 29, 1966 S. R. HOH 3,243,687
ENERGY CONVERTER
Filed Feb. 3, 1960 8 Sheets-Sheet 7
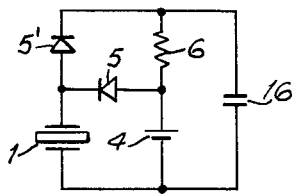
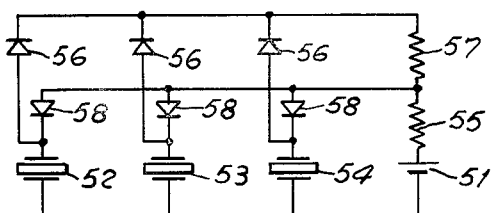
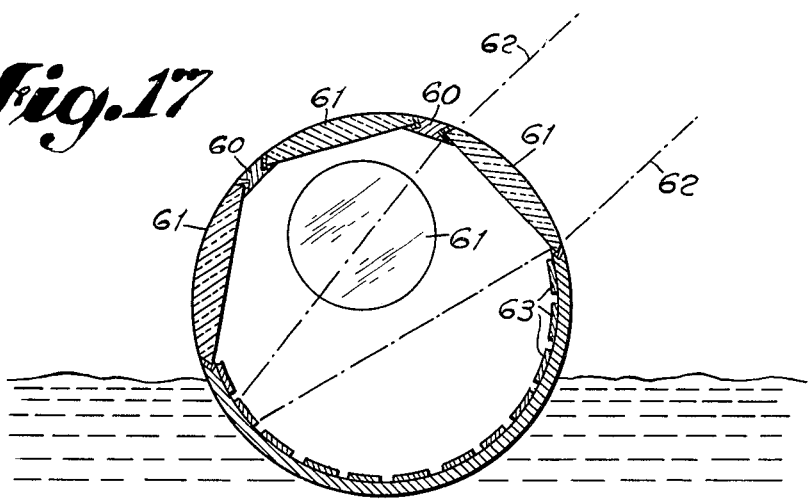
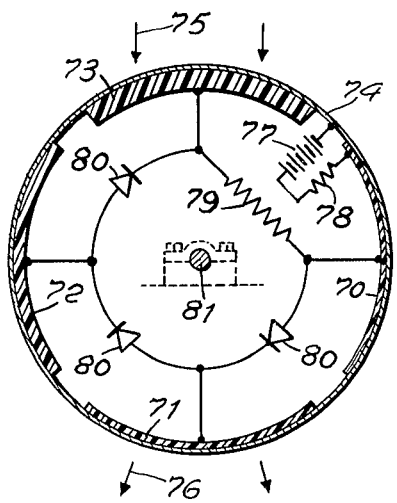
INVENTOR.
SIEGFRIED R. HOH
BY
ATTORNEY March 29, 1966 S. R. HOH 3,243,687
ENERGY CONVERTER
Filed Feb. 3, 1960 8 Sheets-Sheet 8

INVENTOR.
SIEGFRIED R. HOH
BY
Robert Lieber
ATTORNEY

United States Patent Office 3,243,687
Patented Mar. 29, 1966

3,243,687
ENERGY CONVERTER
Siegfried Richard Hoh, Belleville, N.J., assignor to International Telephone and Telegraph Corporation, Nutley, N.J., a corporation of Maryland
Filed Feb. 3, 1960, Ser. No. 6,395
43 Claims. (Cl. 322—2)

The invention herein relates to the conversion of thermal energy into electrical energy by means of an application of heat to an element having an associated dielectric constant characteristic which vary with temperature. This is a continuation in part of my U.S. application Serial No. 821,029, filed June 17, 1959, now issued as U.S. Patent No. 3,073,974 dated January 15, 1963.

In accordance with one aspect of this invention, novel methods and apparatus, for converting thermal energy into alternating or direct current electrical energy, are disclosed. Another aspect of the invention, also disclosed herein, concerns novel methods and apparatus for transferring heat into, or out of, a thermally insulated enclosure, thereby respectively heating or refrigerating the enclosure.

It has long been recognized that, at the present rate of consumption, conventional fuels as sources of energy will be exhausted in a relatively short period of time. The advent of nuclear sources of energy has mitigated the problem somewhat, but nevertheless, efforts are being made to utilize sources of energy hitherto ignored, or rejected, due to lack of apparatus and methods for properly and efficiently utilizing them. One such source of energy is the sun. The vast amount of solar energy available is vividly expressed in the estimate that forty hours of solar radiation hitting the earth equals the total energy in the earth's coal, oil and gas reserves, and forty days exposure to solar radiation equals the earth's nuclear energy reserves (P. C. Putnam, Energy in the Future, D. Van Nostrand Company, 1953). Certain applications of solar energy utilizing reflectors to concentrate heat energy have been made, and more recently, research and development has been concentrated on devices which convert solar energy to electrical energy. Among these devices are thermoelectric, thermionic, and photovoltaic converters. The latter appear to be the most advanced, and have, at present, little competition in the conversion of solar energy to electrical energy. Thermoelectric and thermionic converters are utilized mainly for the conversion of heat energy derived from energy release processes, such as combustion, nuclear reaction, and the like.

Practical solar energy converters should be capable of delivering energy at minimum cost and with power output per pound competitive with other converters. Power output per pound becomes of prime importance particularly where portable applications, in space vehicles and the like, are visualized.

The present invention utilizes none of the techniques mentioned above, but rather depends upon a phenomenon which may be termed the "thermo-dielectric effect." The thermoelectric, thermionic and photovoltaic effects are well known, as evidenced by recently issued literature on these subjects and still another effect, known as the pyroelectric effect, has been disclosed in a number of prior art patents. In one of these patents, heat energy is applied to a pyroelectric crystalline substance, with a polarizing or ionizing potential applied to terminals connected to the crystal at points of opposite polarity. Thus, in the pyroelectric effect, heat is utilized to free bound charges which, in the free state, are permitted to leak off for utilization in an external circuit. In other applications of the pyroelectric effect, bound charges, previously stored in a crystal as a result of spontaneous polarization, are released, and the resultant current measured, by raising the temperature of the crystal above the Curie point. However, there is no net electrical energy gain associated with the pyroelectric phenomenon. Furthermore, the associated devices are of relatively low efficiency, and techniques required for utilization of the pyroelectric effect are too cumbersome to provide for portability and relatively high output per pound. Also, the pyroelectric effect appears only in certain crystalline solids, whereas the present invention may be practiced utilizing solid, liquid, or gaseous dielectrics which exhibit a change in permittivity in association with a temperature change.

It is, therefore, an object of this invention to provide a converter, for converting thermal energy to electrical energy, which compares favorably in efficiency, weight and cost with existing converters.

Another object is to provide a method and apparatus for converting thermal energy to electrical energy with an associated net gain in the system output of electrical energy in relation to electrical energy directly supplied to the system.

A further object is to provide an energy converter, and associated method of operation for absorbing thermal energy from an enclosure, thereby cooling the enclosure.

Yet another object is to provide a portable energy converter for utilization in connection with space vehicles. The applications, of the energy converter of this invention in space vehicles, appear to be most promising in that ideal conditions, for the most efficient utilization thereof, exist in the space environment. The space environment is ideal because it is there that extremes of high and low temperature exist only a shadow apart. It is a simple matter to impart rotary motion to a space vehicle such as an orbiting satellite, for example, and thereby obtain operation of the present energy converters, alternately exposing the elements of a converter to the high radiant heat of the sun during one rotational phase of the vehicle, and to the extreme cold of outer space during another phase when the elements are in the space vehicle's own shadow. Many other useful applications of this invention in space vehicles can be foreseen. Among them, a promising application appears to be the utilization of these converters in combination with the presently unutilized heat generated by rocket engine exhausts. Placing such converter elements near the rocket exhaust, it is possible to obtain relatively high voltages by sequentially heating a plurality of converter elements, and thereby power some high voltage utilization device required to operate for only the first few minutes after launching. Other equally useful applications, in terrestrial environments, include the conversion of waste heat in nuclear reactors, automobile engines, exhaust stacks of factories, and the like, into electrical energy.

A feature of this invention concerns the utilization as a thermal energy converting element, of an element having a permittivity characteristic which varies with temperature.

Another feature concerns the utilization, in a heat transfer system, of dielectrics in which, under adiabatic conditions, the change in temperature, due to a change in specific heat accompanying a variation in electrical charge, is greater than the change in temperature due to dielectric heating.

A further feature concerns the utilization, in an energy converter, of dielectrics exhibiting a specific heat anomaly due not only to a change of phase, but also to a change in state in a region of Critical temperature.

Another feature involves the utilization of a plurality of energy converting elements which are alternately exposed to a heat source and a heat sink to provide amplified electrical energy across a load coupled to the elements.

Yet another feature involves the utilization of an element having a permittivity characteristic which varies as a function of temperature over a given temperature range. Means are included for varying the temperature of the element over a temperature range including first and second temperature to thereby decrease the permittivity thereof from a first value, related to the first temperature, to a second value corresponding to the second temperature. As a result, the potential energy of a given amount of electrical charge stored in the element is increased from a first to a second potential energy level. A load is connected across the element in a circuit arrangement which prevents utilization of the stored charge until the potential energy thereof has increased to a level greater than the first level. Thereafter, the temperature is varied in the opposite sense, and as the temperature reverts to the first temperature value, a charging means associated with the element transfers additional charge to the element to replenish at the first potential energy level any charge dissipated through the load.

The above and other features and objects of this invention will become more apparent by reference to the following description, taken in conjunction with the accompanying drawings, in which:

FIG. 1 provides illustrative graphs of permittivity vs. temperature which are representative of the general characteristic required of dielectrics in accordance with the teachings of the invention under high and low field strength applications.

FIG. 4 is a schematic diagram of the basic circuitry utilized in the converter for converting thermal energy to electrical energy.

FIG. 5 is a block diagram indicating the conditions of the various parameters of the converter element of FIG. 4 at the end of each method step required to cause the element to convert thermal energy to electrical energy.

FIG. 6 is a portion of the Total Energy vs. Temperature curve of FIG. 2 enlarged to show the operating region of the converter.

FIG. 7 is a portion of the Specific Heat vs. Temperature curve of FIG. 3 enlarged to show the operating region of the converter.

FIG. 8 is a block diagram which indicates the condition of the various parameters of the converter element of FIG. 4 at the end of each method step required to enable the element to absorb thermal energy from a closed system.

FIG. 11 is a schematic representation of energy conversion apparatus utilizing water as a dielectric in the converter element.

FIG. 12 is a schematic representation of energy conversion appartus for converting thermal energy into alternating current electrical energy.

FIG. 13 is a schematic representation of energy conversion apparatus for converting thermal energy into three phase alternating current.

FIG. 14 is a schematic representation of energy conversion apparatus for convetring thermal energy into relatively high frequency alternating current.

FIG. 15 is a schematic representation of energy conversion circuitry for converting thermal energy into unidirectional electrical energy while recirculating an initial charge through a load to the charging source without dissipation of charging source power.

FIG. 16 is a schematic of energy conversion circuitry for converting thermal energy into unidirectional energy utilizing a plurality of converter elements which are operable at different times and which require no battery power after receiving an initial charge.

FIG. 17 shows a buoy for the utilization of solar energy in which the circuitry of FIG. 16 can be used.

FIG. 18 is a schematic representation of energy conversion apparatus for producing high voltage undirectional electrical energy.

Figure 1:
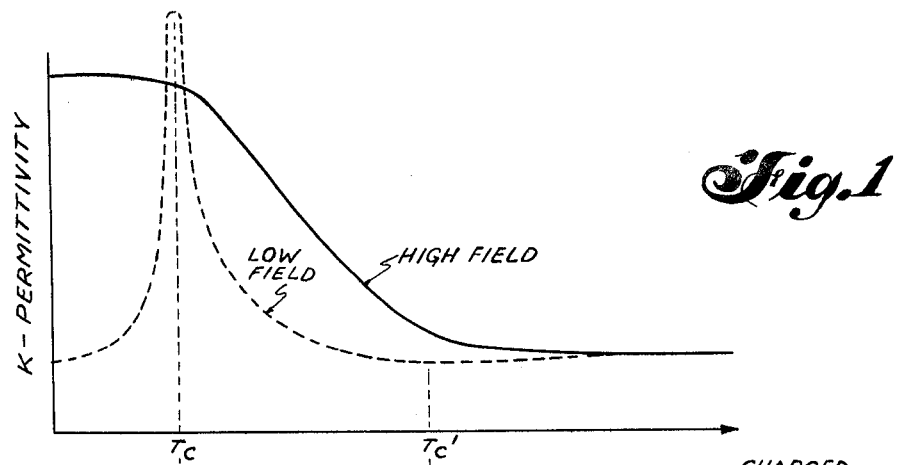
Figure 2:
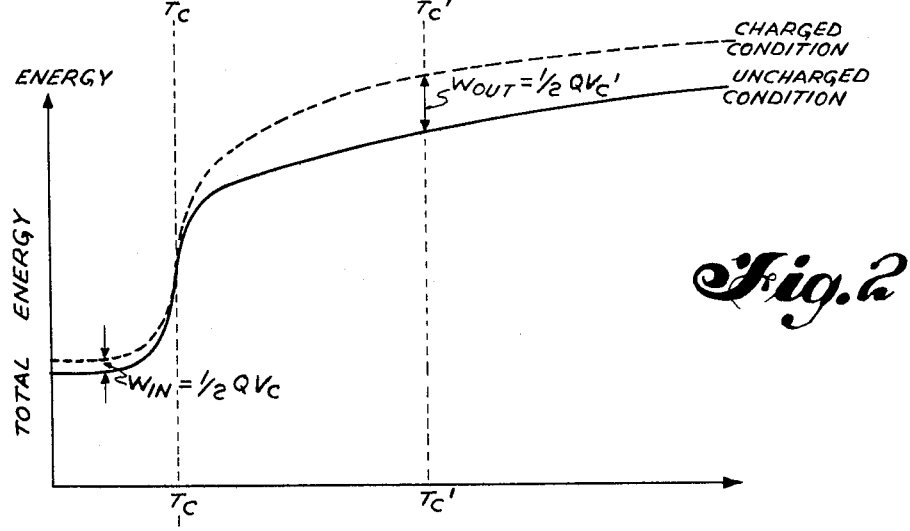
FIG. 2 is a graph of total energy vs. temperature for an energy converter element in the uncharged and charged states.
Figure 3:
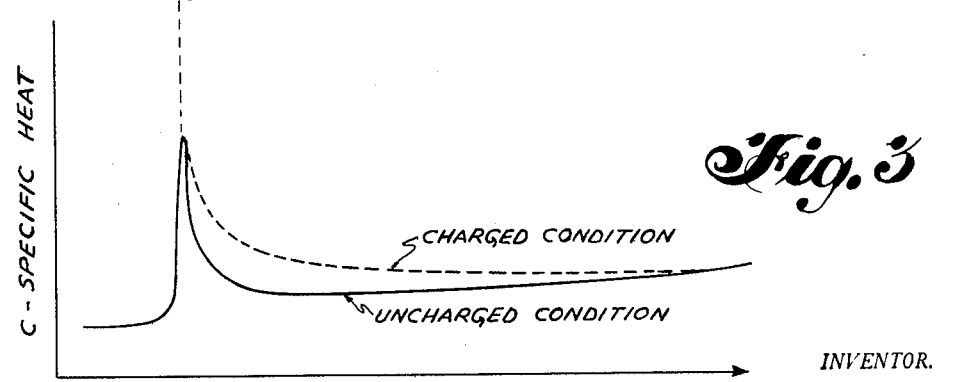
FIG. 3 is a graph of specific heat vs. temperature for an energy converter element in the uncharged and charged state.

Referring to FIGS. 1, 2 and 3, curves shown therein illustrate, respectively, the permittivity, total energy and specific heat versus temperature characteristics representative of characteristics required of dielectrics utilized in the conversion elements of the present invention. FIG. 1 indicates, for the purposes of this invention, that it is desirable to have a relatively large variation in permittivity over a small temperature range. Many dielectrics, including ferroelectric materials such as barium titanate, for example, exhibit this desired characteristic. The solid line curve in FIG. 1 illustrates, by way of example, the temperature dependence of the permittivity of barium titanate crystals, over a temperature range including the Curie point, in accordance with measurements taken with relatively high intensity A.C. fields applied to the crystals. The monotonic variation of the permittivity relative to the temperature should be noted, in this instance, and contrasted to the variation shown in the dotted line curve wherein the measurements were made with relatively low-level alternating fields applied to the crystals. The latter curve illustrates a sharp rise and decay in the permittivity parameter over a narrow temperature range approximately centered at the Curie point.

In FIG. 2, the curve of total energy vs. temperature, where "total energy" characterizes the electrical energy associated with charges stored in a dielectric, in combination with the thermal energy absorbed therein; exhibits a sharp increase in total energy, in both the charged and uncharged conditions, in the region of the Curie temperature of the dielectric material under consideration. At this temperature, a phase transition or change in the molecular structure of the dielectric occurs. Thus, in ferroelectric materials such as barium titanate, a phase transition of the crystal lattice occurs in association with a specific heat anomaly. The phase change, in barium titanate is accompanied by a change in the crystal lattice structure from a tetragonal configuration to a cubic configuration. The sharp increase in thermal energy absorption at the Curie temperature is attributed to what may be termed as the destruction of the spontaneous polarization which exists in the dielectric material at temperatures below the Curie point. The total energy due to thermal energy applied to an uncharged dielectric is indicated, in FIG. 2, by the solid line curve entitled Uncharged Condition and the total energy due to absorbed thermal energy and electrical energy associated with a charge on the dielectric is shown in the dotted curve entitled Charged Condition. It may be shown that, for any given temperature, the amplitude difference between points on the charged and uncharged curves is the amount of electrical energy present, and as will be explained hereinbelow this is equal to $E_e = \frac{1}{2}QV$, where Q is the charge on an energy storage element and V is the potential or voltage of the stored charge.

The specific heat anomaly referred to above is shown clearly in FIG. 3, wherein it may be seen that, above the Curie temperature, the given dielectric material starts to exhibit a marked variation in the relative values of specific heat associated with the charged and uncharged conditions. It is this phenomenon that is utilized in one aspect of this invention, to obtain refrigeration. It should also be noted that below the Curie temperature for any given temperature, there is practically no variation in the difference between the specific heat values for the charged and uncharged conditions, and it should further be noted that at some temperature greatly in excess of the Curie point the difference between the values of specific heat for the charged and uncharged conditions is zero. From the examples and explanations to follow herebelow, it will be seen that the region where the dielectric element exhibits a wide variation in the difference between specific heat values, for a given temperature variation, is the region to be utilized for the most efficient refrigeration operation.

The operational principles and basic circuit associated with the ferroelectric energy converter of this invention are revealed in FIG. 4, when taken in conjunction with the following description.

In FIG. 4, an energy conversion element 1 includes a pair of oppositely disposed conductive plates 2 separated by a dielectric material 3, such as barium titanate. A source of electrical energy 4, such as a battery, is connected to the electrodes 2 of element 1, to transfer a given charge thereto, and a holding diode 5 having a high back voltage is utilized to maintain this charge on the element, when the electrical potential energy thereof exceeds that of the battery. A Zener diode 5′, or similar switching element in series with a load 6, prevents the application of energy to the load, until a given voltage is reached. Of course, the breakdown voltage of Zener diode 5′ is less than the breakdown voltage of the ordinary holding diode 5. Load 6 is a utilization circuit, coupled through Zener diode 5′, to conductive electrodes 2 of energy storage element 1. A source of thermal energy 7, such as the sun, a gas flame, natural steam, or the like, is disposed externally of element 1. A means 8, for selectively exposing element 1 to energy source 7, is shown in FIG. 4 in the form of a mechanical shutter disposed between source 7 and element 1. Shutter 8 may be actuated mechanically by means of a handle 9, or by any other suitable electrical or mechanical means.

In operation, element 1 is initially maintained in a charged state by means of battery 4 through holding diode 5 which has a high back breakdown voltage. Energy storage element 1 is initially charged at a given temperature shown at $T_c$ in FIG. 1. The point $T_c$, in FIG. 1, is taken at the Curie temperature by way of example only, and under conditions of high A.C. field strength operation, or with D.C. fields applied, as in the present instance, the temperature $T_c$ may be above or below the Curie temperature since the permittivity variation is monotonic under these conditions. With element 1 maintained at temperature $T_c$, its capacitance $C_c$ is related to electrical charge on energy storage element 1 as follows:

$$Q = C_c \cdot V_c$$

where $V_c$ is the voltage of battery 4. The electrical energy stored in element 1 is therefore given by:

$$W_c = \tfrac{1}{2} Q \cdot V_c$$

If thermal energy is applied to energy storage element 1 from source 7, the temperature of the element eventually rises to a temperature $T_c'$, and its permittivity drops to $K_c'$ in accordance with the solid line curve in FIG. 1. There is a corresponding decreased capacitance:

$$C_{c'} = \frac{K_{c'}}{K_c} \cdot C_c$$

Since the charge Q cannot decrease because of holding diode 5, there must be a rise of capacitor voltage from $V_c$ to $V'_{c'}$ by the factor $K_c/K_{c'}$. The conservation of charge requires:

$$Q = C_c \cdot V_c = C'_c \cdot V'_{c'} = \frac{K_{c'}}{K_c} \cdot C_c \cdot \frac{K_c}{K_{c'}} \cdot V_c = \text{Constant}$$

Hence, the capacitor voltage has been stepped up by heating energy storage element 1. The increased voltage of energy storage element 1 also means an increase of electrical energy W by the factor $K_c/K_{c'}$ because $$W_{c'} = \tfrac{1}{2} Q \cdot V'_c = \tfrac{1}{2} Q \cdot V_c \cdot \frac{K_c}{K_{c'}}$$

Thus, in the absence of a charge variation, an energy increase $$\Delta W = W_{c'} - W_c = \tfrac{1}{2} Q V_c \left( \frac{K_c}{K_{c'}} - 1 \right) = \tfrac{1}{2} Q \Delta V$$

due to the conversion of thermodynamic or heat energy into electrical energy, is obtained. If the temperature is sufficiently increased, the voltage across conductive plates 2, of element 1, will increase until Zener diode 5′ is broken down, and the voltage is thereupon, in effect, coupled directly to the load 6 where the increased energy, associated therewith, may be utilized. If the temperature, of element 1, is thereafter decreased by manipulating shutter 8, the permittivity will rise and the voltage of element 1 will be proportionally reduced. Eventually, the impedance of Zener diode 5′ will abruptly rise, thereby decoupling the converting element 1 from the load 6. The temperature is decreased until the potential on element 1 drops to a level at which the battery again supplies charge to the element through diode 5, thereby replenishing the charge on element to maintain the previously cited initial charge value. Thereafter, the temperature cycling, via the manipulation of shutter 8, is repeated, and the energy associated with the initial charge is again amplified through the absorption and conversion of thermal energy, and amplified energy is again applied to the load.

It should be noted that the battery 4, in FIG. 4, is provided only by way of example, as a means for initially charging and subsequently recharging element 1 at a low potential energy level. In a one-shot, or short term, application in, for example, a space vehicle, battery 4 may readily be eliminated, providing an initial bound charge is stored in the element 1, which, in this instance, is a ferroelectric crystal. Bound charges may be stored in such crystals, by means of a process known as "poling," wherein a crystal, having a given D.C. voltage applied thereto is heated to a temperature above the Curie point and is thereafter cooled below the Curie point with the given voltage still applied. The source of the given voltage is then removed, and the crystal shorted out to remove excess free-charge. The state of polarization of the crystal is then such that a subsequent increase in temperature, above the Curie point, will produce structural stresses which release bound charges, transforming them into charges free to flow as an electric current. Thus, deleting battery 4 and diode 5 from FIG. 4, and substituting a "poled" crystal for the conversion element 1, the crystal temperature must be elevated to the Curie point before a free charge, at an associated voltage, is obtained across conductive elements 2. If Zener diode 5′ is properly selected, the temperature of the crystal may be elevated to a value well in excess of the Curie point, before the free charge of the "poled" crystal attains a potential energy level sufficient to break down the diode and circulate through the load.

Another source of initial and replenishing charge for element 1 of FIG. 4 may be provided by detection circuits responsive to radiated electromagnetic energy to transfer a D.C. potential across the element 1 through the holding diode 5. Thus, the conversion structure of FIG. 4 could be utilized to power telemetering equipment in a space vehicle, with detected signals from ground station telemetering transmitters serving as both coded intelligence, and auxiliary power for replenishing charge dissipated from the element 1.

Figure 4A:
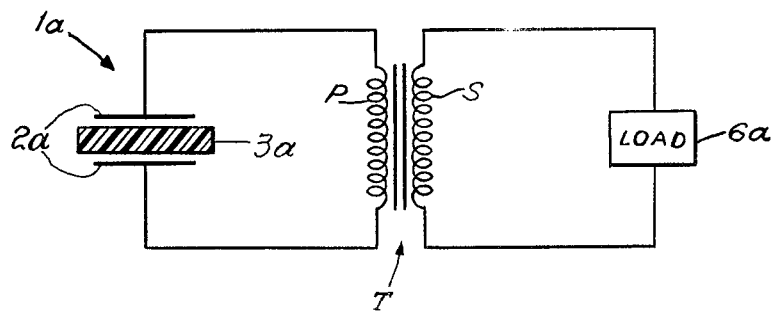
FIG. 4A is a schematic drawing illustrating a modified basic circuit for converting thermal to electrical energy.

It should further be noted that the function of the Zener diode 5', in FIG. 4, namely, the prevention of the dissipation through load 6 of charges stored on element 1, until the potential energy, at which the charge was stored, is amplified by the absorption of thermal energy in element 1, may also be provided, as illustrated in FIG. 4A, by properly delaying the application of energy to the load, utilizing circuit component time constants to provide the desired delay. In this figure, all elements providing functions having corresponding counterparts in the system of FIG. 4 retain the same identifying numerals, together with the subscript $a$. Accordingly, it is seen that a charge stored on element 1$a$ in FIG. 4A, whether obtained by means of the aforementioned "poling" process, a battery, or any other source, will have an associated potential energy which may be amplified by means of rapidly applied thermal energy obtained, for example, from a rapidly interrupted infra-red energy beam. If the element 1$a$ is properly cycled, an inductive element such as the primary P of the transformer T shown, in FIG. 4A, can be made to exchange the energy of its magnetic field with the energy of the stored electric field of the element 1, in the manner of a tank circuit. In effect, this arrangement provides the equivalent of a low frequency parametric oscillator, with "pump frequency" energy supplied through the conversion of thermal energy at the rate of the temperature cycling apparatus. The output of the oscillator is transferred, as indicated, by means of the secondary winding S of transformer T, to the load 6$a$. It has been further observed, in connection with this invention, that a circuit configuration as in FIG. 4A requires no initial sources of charge in operation, since thermally induced electrical noise within element 1$a$ is amplified during the absorption of thermal energy and resonated in the tank circuit comprising element 1$a$ and transformer T, with a resultant build-up of charge.

The same basic circuitry of FIG. 4 may be utilized in operating energy storage element 1 as a heat absorber from a closed system. The only distinctions would be that the source of thermal energy 7 would be a finite source of heat such as from a closed room which is to be refrigerated. From the equation $$H_e \approx C \cdot T \cdot M$$

wherein $H_e$ = Thermal energy contained in a given body,
$C$ = Specific heat of the given body,
$T$ = Temperature of said body,
$M$ = Mass of said body, it may be seen that if the heat energy of a body remains constant and the specific heat is increased, it follows that the temperature of the body must decrease in order to maintain the heat energy at the given value. Considering the foregoing statement with the specific heat vs. temperature curve of FIG. 3, it can be seen that by applying electrical energy to energy storage element 1, the specific heat to element 1 is changed from an uncharged value to a charged value. It follows, therefore, that the temperature of the element must decrease if the thermal energy in energy storage element 1 remains constant. There is, however, a contribution of thermal energy due to the so-called heat of polarization. This thermal energy change, due to the heat of polarization, is believed, however, to be relatively small and does not increase the total thermal energy significantly. In view of this, it is believed that the change in specific heat is great enough to provide a net drop in temperature rather than a rise in temperature. Thus, if there were no change in specific heat the temperature of the element would increase. The temperature change due to polarization, therefore, is believed to be substantially less than the change in temperature due to corresponding changes in specific heat. In this manner, the change in specific heat between the charged and uncharged conditions plays an important part in the operation of energy storage element 1 as an absorber of heat from a closed system.

Referring now to FIGS. 5, 6 and 7, the method of operation of energy converting element 1 as a converter is shown, and in FIG. 5 the condition of the various parameters of energy storage element 1 is indicated at the end of each method step. The condition of energy storage element 1 in relation to total energy and specific heat is shown in FIGS. 6 and 7, respectively, at the end of each method step to indicate clearly the gain in electrical energy and the variation in the specific heat as both electrical and thermal energy are applied to the element. In FIG. 5, block $d$ shows the various parameters involved and indicates what the condition of these parameters should be at the start of the conversion cycle.

The initial conditions of the various parameters of element 1, then, are as follows: The permittivity of the dielectric 3 utilized in element 1 of FIG. 4 is at a given value which should be a maximum value within the temperature range being utilized. This is in accordance with the curve of FIG. 1 and with the theory that energy storage element 1 should be charged up initially at a relatively high value of permittivity. FIG. 5 indicates that the electrical energy is zero and the points $d$ in FIGS. 6 and 7 indicate, respectively, the total energy and specific heat of energy storage element 1 in the uncharged state.

The first step in the method of converting thermal energy into electrical energy is indicated in FIG. 5 at A. Thus, the first step is that of applying electrical energy to energy storage element 1 of FIG. 4 from battery 4 at a given point in the usable temperature range. This given temperature, $T_d$ is indicated in FIGS. 6 and 7 as a temperature slightly above the Curie temperature $T_c$ of the dielectric material. The given temperature, however, may be the Curie temperature $T_c$ or may be a temperature in excess or below the Curie temperature of energy storage element 1. The temperature $T_d$ as shown in FIGS. 6 and 7 has been chose slightly in excess of the Curie temperature because at this point the dielectric constant is substantially maximum for all field strength conditions, and also because this is the point at which a minimum change in temperature is required to obtain the greatest gain in electrical energy. In FIG. 5, then, the conditions of the various parameters after the application of electrical energy at the given temperature are shown in block $a$. Thus, the electrical energy, the voltage and the charge of energy storage element 1 increase, while the thermal energy, the permittivity and the capacity of energy storage element 1 remain constant.

The temperature is indicated in FIGS. 6 and 7 as having remained at the temperature $T_d$. The temperature, however, tends to decrease as can be recognized from the fact that the specific heat has increased in FIG. 7 from point $d$ to point $a$. This increase in specific heat ordinarily would be accompanied by a drop in the temperature of converter or energy storage element 1 but, for the purposes of this exposition, it is assumed that, as the specific heat changes, sufficient thermal energy is absorbed to maintain element 1 at the temperature $T_d$. In FIG. 6, therefore, the line $da$ represents the amount of electrical energy added to the already present thermal energy of energy storage element 1 and this electrical energy is equal to $$W_a = \tfrac{1}{2} Q \cdot V$$

Referring again to FIG. 5, the next step in the method is indicated, at B, as the step of subjecting element 1 to a source of thermal energy to vary the thermal energy of the element, thereby varying the permittivity and electrical energy thereof. After heating, block $b$, in FIG. 5, indicates the condition of the various parameters of energy storage element 1. The temperature has increased to a value $T_{c'}$ as shown in FIGS. 6 and 7 and the permittivity, in accordance with the curve of FIG. 1 has decreased to a relatively low value at the temperature $T_{c'}$. As a result of this decrease in permittivity, the voltage of element 1 increases and therefore, the electrical energy of energy storage element 1 increases; the charge having remained substantially constant due to the presence of diodes 5 and 5' of FIG. 4 while the voltage across the element was increasing. Since thermal energy is being added to energy storage element 1, it is expected that the absorbed thermal energy should increase. It has been observed that the absorbed thermal energy does appear to increase, but not in proportion to the amount of thermal energy added. It is at this point, then, that a conversion, of thermal energy to electrical energy, takes place.

The conversion mechanism may be explained as follows: Part of the applied thermal energy is expended to randomize the aligned electric dipoles of the polar dielectric material being utilized. This energy appears as added electrical energy on the element 1. The mechanical equivalent of element 1 may be viewed as a capacitor in which part of the dielectric is withdrawn, by mechanical energy, from between the plates, in the presence of an electric field. In this instance, as in the application of thermal energy, the work expended appears as an increased voltage and, accordingly, an increase in the electrical energy stored on the capacitor.

The increase in voltage at the end of step B has been experimentally verified. A ferroelectric capacitor, similar to element 1 of FIG. 1, was prepared from a thin sheet of a barium strontium titanate having dimensions of approximately ½ x 2 x .005 inches and having a Curie temperature of 35° C. The low field permittivity K, at this point was approximately 10,000. The capacitor was utilized in a circuit similar to that shown in FIG. 4 and the load connected across the output terminals was a vacuum tube voltmeter. An infrared lamp was used as a heat source. Upon heating from a room temperature of approximately 22° C., the capacitor first reached the Curie temperature, $T_c$, of approximately 35° C. The vacuum tube voltmeter at this point read essentially the voltage of the charging battery 4. On further heating, the capacitor voltage rose above the voltage of charging battery 4, and at a temperature of approximately 90° C., the capacitor voltage had more than tripled. The value of the permittivity at the 90° temperature had dropped to approximately one third of its original value as measured at 35° C. Values of voltage of 76 volts and 260 volts were obtained at the Curie temperature and at 90° C. respectively. Since the energy under constant Q conditions is proportional to the voltages at the two temperatures the energy gain is proportional to the voltage at 90° C. divided by the voltage at the Curie temperature and in this instance equals an energy gain of 3.4. By alternately cycling the temperature between the two points mentioned, the voltage increased to the higher value of voltage each time the source of thermal energy was applied to the energy converting element 1.

In FIG. 6, then, the total energy of element 1 has increased from $a$ to $b$ along line $ab$ and in FIG. 7, the specific heat has decreased from point $a$ to point $b$ along line $ab$. In this connection, it should be noted that, although the specific heat has been shown as decreasing in FIG. 7, it is not necessary that the specific heat change occur in this way. Since the specific heat function is the derivative of the total energy curves in the charged and uncharged condition, the specific heat could increase, decrease or remain constant without adversely affecting the operation of energy storage element 1.

The next step in converting thermal energy to electrical energy is shown at C in FIG. 5, as the step of extracting electrical energy from energy storage element 1 at a voltage and permittivity different from the initial voltage and permittivity. Block $c$ of FIG. 5, then, shows the conditions of the various parameters during the extraction of the electrical energy. It should be noted on the curves of FIGS. 6 and 7 that the discharge of energy storage element 1 takes place from point $b$ on the charged condition curve to point $c$ on the uncharged condition curve and that the temperature is shown as remaining at the temperature $T_{c'}$ during this operation. The length of line $bc$ is indicative of the amount of electrical energy obtained by discharging energy storage element 1 and is notably greater in length than the line $da$ which is the amount of electrical energy supplied by charging element 1. The difference in the lengths of the lines $bc$ and $da$ is, then, equal to the amount of electrical energy gained by application of thermal energy to converter element 1.

The final step in the method is shown in FIG. 5 at D and is the step of cooling element 1 to decrease the temperature thereof thereby returning the temperature of the element to the initial given temperature. The cooling step may be carried out in any well known manner but the simplest of these methods is that shown in FIG. 4 wherein the mechanical shutter B is utilized to block the flow of thermal energy from source 7 to element 1. In this manner, the heat absorbed by element 1 is allowed to radiate to the ambient value of temperature. In connection with the cooling step D, it should be noted that for space applications wherein the source of thermal energy utilized is the sun, it is most convenient to effect relative motion between the source 7 and the element 1 by rotating the element into a shadow cast by the space vehicle. In this manner, the converter element 1 is both heated and cooled by radiation to and from the element, by alternately exposing the element towards and away from the sun. Referring again to curves 6 and 7, it may be seen that the temperature has decreased at the end of the cooling step from $T'_c$ to $T_d$ and that both the total energy and the specific heat of element 1 are at the values previously designated as initial conditions.

From the foregoing, it may be seen that all that is required to provide an electrical energy output, which is amplified relative to the original electrical energy input is to provide thermal energy to a converting element having associated characteristics, notably permittivity, which change with temperature in a predetermined manner.

Figure 9:
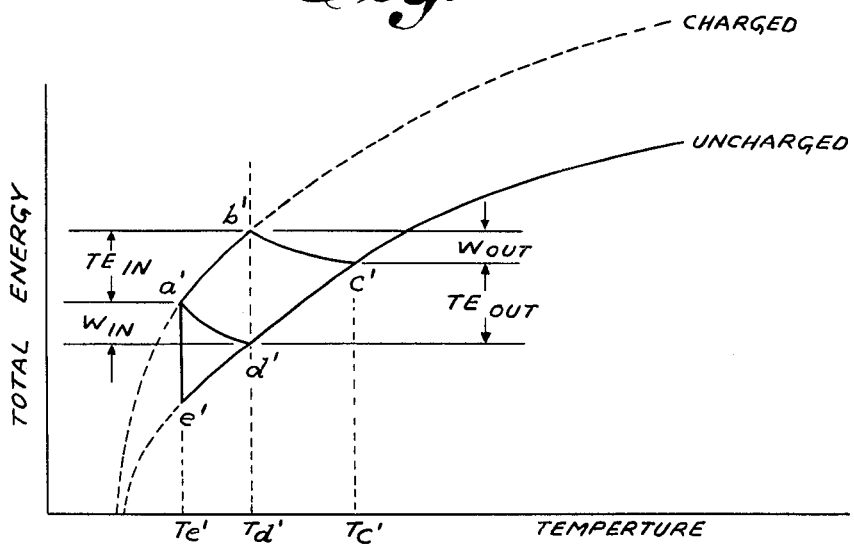
FIG. 9 is a portion of the Total Energy vs. Temperature curve of FIG. 2 enlarged to show the region of operation of the refrigerating embodiment of the invention.
Figure 10:
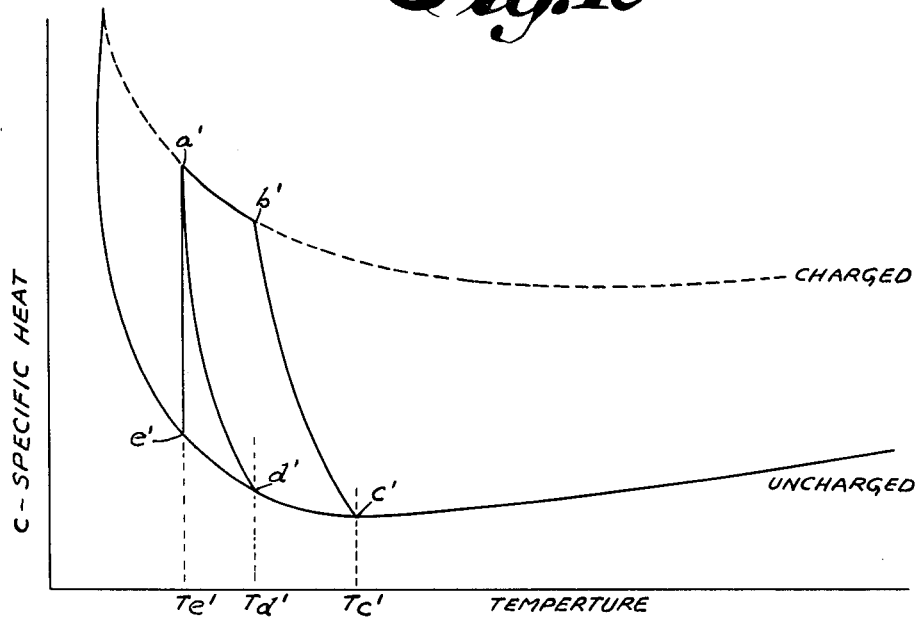
FIG. 10 is a portion of the Specific Heat vs. Temperature curve of FIG. 3 enlarged to show the region of operation of the refrigerating embodiment of the invention.

Referring now to FIGS. 8, 9 and 10, FIGURE 8 illustrates the variation of the different parameters of energy converting element 1, at the end of each of the method steps which are performed to cause energy storage element 1 to act as a refrigerator, or absorber of heat from a closed system. FIG. 9 shows the variation in total energy with temperature as the steps of the method are performed on the element 1, and FIG. 10 illustrates the specific heat vs. temperature characteristic obtained during the operation of element 1 as a refrigerator. The basic method steps as outlined in connection with the converter embodiment of FIG. 5 are the same when operating energy storage element 1 as a refrigerator with the exception that certain criteria, as to operating temperatures and ranges of specific heat, must be strictly adhered to in order to obtain refergerator operation. The values of the parameter shown in block $d$ of FIG. 8 correspond to the values of the parameters given for energy converter element 1 in block $d$ of FIG. 5. The first step, shown at A' in FIG. 8, in the operation of element 1 as a cooling device, is the step of applying electrical energy to element 1 at a given voltage within a given temperature range to change the specific heat thereof from an uncharged value to a charged value. This step includes the step of disconnecting element 1 from a heat sink to prevent the temperature from being maintained at a constant temperature during charging. The given temperature range may be defined as a range wherein the differences in specific heat between the charged and uncharged condition are increasing as the temperature increases. It is in this range that converting element 1 may interchange energy with its surroundings without violating either the second law of thermodynamics or the law of conservation of energy. Referring now to FIGS. 9 and 10 and to block $a'$ of FIG. 8, it can be seen that the total energy and specific heat have increased and the temperature of energy storage element 1, because of the change in specific heat, has dropped below that of the ambient temperature shown as $T_{d'}$ in FIGS. 9 and 10. Temperature $T_{d'}$ is a temperature slightly above the Curie temperature and is in the region where the permittivity is decreasing as the temperature increases. The temperature then, in dropping to the temperature of point $a'$ causes a slight increase in permittivity. The drop in temperature occurs due to the change in specific heat and predominates over the increase in temperature due to the liberation of the so-called heat of polarization. The temperature, therefore, is not forced to remain constant as with the converter element but rather is allowed to drop as a prelude to the next step in the method as shown in FIGS. 9 and 10. Thus, it can be seen in FIGS. 9 and 10 at point $a'$ that the thermal energy has decreased indicating that the thermal energy present at point $d'$ has been partially converted to electrical energy.

The next step, at B′ in FIG. 8, is the step of applying thermal energy to element 1 to vary the temperature of the element while maintaining it in a charged condition. This step includes the step of connecting element 1 to a source of thermal energy. In this instance, the source of thermal energy would be some enclosed system such as a room which is to be cooled by the absorption of heat therefrom. Thus, at the end of step A′, the total energy and specific heat are as shown at $a'$, in FIGS. 9 and 10, respectively, at a temperature lower than the heat sink or ambient temperature $T_{d'}$. In these same figures, after energy storage element 1 has been heated as shown in step B′, the total energy and specific heat are shown at point $b'$ on these curves. These points are shown at the temperature $T_{d'}$ which is the ambient temperature or the temperature of a heat sink and is the maximum point to which the temperature of element 1 is allowed to rise. This is a practical consideration, however, for if the temperature of the system which is to be cooled is higher than ambient the simplest approach would be to connect the closed system to the ambient heat sink and permit the closed system to be cooled by radiation and conduction. The criterion to be fulfilled here is that thermal energy be taken on at a temperature lower than ambient and discharged at a temperature higher than ambient temperature.

In FIG. 10, it can be seen that the specific heat decreases from point $a'$ to point $b'$. It is not necessary that the specific heat act in this manner in order to obtain operation of energy storage element as a cooling means. Thus, the slopes of the curves of FIG. 9 govern the shapes of the curves of FIG. 10. The curve of FIG. 9 is, in turn, governed by the permittivity characteristic of the particular dielectric material being utilized. Thus, if the characteristics of the dielectric material being utilized can be controlled, as for instance, by introducing appropriate impurities into barium titanate, the characteristic of the total energy curves can be controlled and therefore, the specific heat characteristics. It can be seen, then, that it is incidental whether the specific heat increases, decreases or remains at the same value over a given temperature range. The criterion to be fulfilled here is that the differences in the values of specific heat, over a given temperature range, for the charged and uncharged condition should be increasing as the temperature increases.

Step C′, shown in FIG. 8, is the next step in the method of utilizing energy storage element 1 as a refrigerator and is the step of extracting electrical energy from element 1 at a voltage different from said given voltage within said given temperature range to change the specific heat from a charged value to an uncharged value. As a result of this step, as shown in FIGS. 9 and 10 at point $c'$, the electrical energy has decreased, the temperature has increased above sink temperature and the thermal energy of storage element 1 has increased. The temperature at point $c'$ is now higher than the sink temperature which was $T_{d'}$ and it is now possible to discharge thermal energy from a higher temperature level to a lower temperature level, temperatures $T_{c'}$ and $T_{d'}$, respectively. The electrical energy at this point has decreased because of the discharge of energy storage element 1. However, the amount of energy available on discharge is less than the amount of energy which was introduced in the step of charging energy storage element 1 in accordance with the second law of thermodynamics. The difference in electrical energy introduced and the amount of electrical energy available on discharge has been utilized or converted in increasing the thermal energy of energy storage element 1. Thus, more thermal energy is available at the end of step C′ than was introduced during step B′. This increase in thermal energy and the simultaneous change in specific heat due to the discharge of energy storage element 1 contribute toward raising the temperature to a temperature $T_{c'}$ which may be much higher than the sink temperature $T_{d'}$. A consideration of FIG. 1 at this point will indicate that the permittivity has at temperature $T_{c'}$ decreased to its lowest value and that in accordance with the change in permittivity the electrical energy at the end of step B′ has increased but nevertheless, as indicated in FIG. 8, the amount of electrical energy obtained at the end of step C′ has decreased from the electrical energy available at that point due to the conversion of some of that electrical energy into thermal energy. Step C′ includes the step of disconnecting energy storage element 1 from the system being cooled and connecting to a heat sink. The final step, D′, is that of cooling energy storage element to affect a change in the thermal energy of element 1 thereby varying the temperature of element 1 within said given temperature range while maintaining element 1 in an uncharged condition. In this way, then, cooling of element 1 may take place by radiation, convection and conduction to the surrounding atmosphere or direct cooling using well-known coolant fluids may be provided. At the end of step D′, then, the various parameters involved have returned to the values indicated in block $d'$ and, as shown in FIGS. 9 and 10, the total energy has decreased to point $d'$ at the starting temperature $T_{d'}$ and the specific heat has returned to the initial value of specific heat at the same temperature. Thus, one cycle in the operation of energy storage element 1 as a refrigerator has been completed. It is clear, then, that by repeatedly cycling energy storage element 1, in the manner described above it is possible to absorb heat from a closed system thereby cooling the system. This cooling, of course, only occurs provided that thermal energy is removed from the closed system faster than it is being gained from other sources.

In connection with the foregoing cycle, it is significant to note that the charge and discharge portion of the cycle have taken place adiabatically rather than by charging and forcing the temperature to remain constant as has been done in the case of the converter. Of further significance, at this point, is the fact that energy converter 1 operating in the region where the differences in specific heat are increasing while the temperature is increasing will operate as an energy converter provided energy storage element 1 is cycled in the following way. Referring now to FIGS. 9 and 10, the cycle should begin at point $e'$ on these curves. By applying heat to energy converter 1 the temperature is raised from $T_{e'}$ at point $e'$ to the temperature $T_{d'}$ at point $d'$. At this point, electrical energy is applied to energy storage element 1 and element 1 is allowed to charge up adiabatically as was done in the case of the refrigerator embodiment; the total energy and specific heat being indicated in FIGS. 9 and 10 as before. At point $a'$, then, if the capacitor were discharged, the total energy and specific heat would tend to change along the lines $a'$, $d'$ provided this cycle is completely reversible. However, by forcing the element 1 to remain at the temperature $T_{e'}$ and discharging along lines $a'e'$ in FIGS. 9 and 10, it is possible to obtain converter action in that more electrical energy is obtained at the output than was placed on energy storage element 1. Thus, there is a net gain in electrical energy and thermal energy has been converted into electrical energy. This operation is not restricted to the particular area shown in FIGS. 9 and 10 but may be carried out an any point on these curves provided the charging of energy converter 1 is accomplished adiabatically and the discharge is accomplished isothermally. It is, of course, apparent that the greatest change in electrical energy available can be obtained in the region of the knee of the curves of FIG. 9. This method of energy conversion is relatively inefficient when compared with the method outlined in connection with FIG. 5, but is interesting from the point of view that if we reverse this cycle and charge up isothermally along lines $e'a'$ in FIGS. 9 and 10 and discharge along line $a'd'$ adiabatically, the temperature of the converter element will be elevated to the temperature of point $d'$. From this, it can be seen that more thermal energy is available than was available at the start of this cycle and that converter 1, in this method of operation, is acting as a heat pump to deliver thermal energy. A conversion of energy has taken place, therefore, and this is indicated by the fact that there is less electrical energy available at the output than was placed on the element at the input.

Up until this point, the dielectric material utilized in energy converter 1 has been referred to as a solid dielectric material, such as barium titanate. It is well-known, however, that many dielectric materials having the desired characteristics exist. These materials can be utilized equally well in the structure of this invention. The dielectrics capable of utilization in the practice of this invention are not limited to solid dielectrics, but rather dielectrics in any state, be it solid, liquid or vapor can be utilized. A converter or refrigerator element may be designed which incorporates a dielectric which assumes two of its three possible states. A dielectric such as pure water, $H_2O$, is such a dielectric and when utilized in its liquid and vapor forms in connection with capacitive energy storage elements, an effective converter of thermal to electrical energy and an effective absorber of thermal energy can be obtained  Referring to FIG. 11, there is shown therein a closed dielectric envelope 10 designed to withstand considerable internal pressures. A metallic electrode 11 is disposed internally of dielectric envelope 10 at the base thereof. Metallic electrode 11 may be a separate sheet of metal lying adjacent the bottom surface of envelope 10 or it may be a metallic film deposited by well-known deposition techniques, vacuum evaporation, for instance. Another electrode in the form of a grid 12 to facilitate vaporization of the $H_2O$ dielectric upon application of thermal energy is spaced from, and disposed in parallel relationship with metallic electrode 11. Electrodes 11 and 12, then, form the plates of a capacitive element similar to that described in connection with energy storage element 1 of FIG. 1. Leads 13 and 14 connect electrodes 11 and 12, respectively, through seals 15 to external circuitry which comprising a source of electrical energy 4, a holding diode 5, and a utilization device 6 similar to those shown in FIG. 1. Holding diodes 5 prevent deleterious feed back during the cooling portion of the cycle to be described hereinbelow. A condenser 16, connected in parallel across load 6, prevents source 4 from discharging through load 6 while higher energy charge is available. Enclosed within dielectric envelope 10 is a given volume of highly purified water, $H_2O$. The given volume of water is sufficient to completely fill the space between electrodes 11 and 12, thereby forming a capacitive element with the water serving as the dielectric. Pure water in liquid form is known to have a permittivity of approximately 80. By removing water from between electrodes 11 and 12, after charging the condenser including these electrodes, it is possible to obtain a substantial gain in energy due to the change in state of the dielectric. This change of state can be accomplished by opening shutter means 8 thereby exposing the dielectric envelope 10 to thermal energy from source of thermal energy 7. By applying thermal energy to envelope 10 the volume of water disposed therein and between electrodes 11 and 12 is heated sufficiently to cause the water to vaporize and pass through grid electrode 12 and fill envelope 10 with water vapor. By this means, the permittivity of water vapor is substituted for the permittivity of water in the liquid state. Because of the pressure build up in dielectric envelope 10, the total energy curve will have a similar configuration to that shown in FIG. 2, both for the charged and uncharged conditions. A closed system, with its consequent pressure build-up, is not necessary for the operation of this device as shown. It may be operated at constant pressure. The exposition made hereinabove requires a less complex analysis and was shown for the sake of clarity.

Since devices as described in connection with FIG. 11, utilize water as a dielectric, require a large amount of energy to provide for the heat of vaporization, the best point at which to operate such a device is somewhere near the upper portion of the knee of the curve shown in FIG. 2. At this point, a small change in thermal energy will convert the water which is in a droplet condition between electrodes 11 and 12 into a vapor. Thus, an amplification of electrical energy, initially transferred to the condenser of FIG. 11, can be obtained by applying thermal energy to vaporize the dielectric thereby changing its state. The gain obtained will be proportional to the difference between the value of permittivity in the liquid and the value of permittivity in the vapor state. The foregoing technique may be applied equally well with other dielectric materials which can be vaporized upon the application of thermal energy, among these are dielectrics such as certain fluorohydrocarbons, formamide, hydrocyanic acid, hydrogen fluoride, dimethylsulfate and ammonia. It should be noted that these materials not only exhibit large changes in permittivity with temperature, but also possess high dielectric strengths in the vapor state.

The device of FIG. 11 may likewise be operated as an absorber of thermal energy in much the same manner as described in connection with FIG. 8. Thus, applying electrical energy to the capacitor formed by electrodes 11 and 12 with a dielectric of water vapor therebetween, the specific heat of the water vapor is increased and the temperature drops below that at which the charge was initially applied. Connecting this condenser to a system which is to be cooled, the condenser will absorb heat until the ambient temperature is reached. At this point, the condenser is disconnected from the closed system which is being cooled and connected to a heat sink which is at ambient temperature. The condenser is then discharged and the specific heat is reduced to an uncharged value and the temperature is increased to some value above the ambient temperature thereby permitting thermal energy at a high temperature to be discharged into a sink of lower thermal energy. Thus, depending upon the temperature one wishes to cool from or upon the temperatures one wishes to utilize in order to gain energy, dielectrics having different vaporization temperatures and different changes in permittivity may be utilized and the method and apparatus of this invention may be applied equally well in conditions where the dielectric is a solid, a liquid or a gas or wherein the dielectric undergoes a transistion of phase or state.

Referring now to FIG. 12 another embodiment of this invention utilizes ferroelectric capacitors mounted on a rotating member to convert thermal energy into alternating current electrical energy. FIG. 12 shows a sectional view of a cylindrical or spherical member 17, rotating about its axis, or center of rotation, 18. Member 17 may be, for instance, a satellite body rotating about axis 18 as it revolves about the earth or another type of rotating space vehicle. Two thin sheets of ferroelectric material 19, 20, such as ceramic barium titanate, are mounted on or within body 17. Conductive electrodes 21, 22, 23, 24 are bonded to ceramic bodies 19 and 20 by vacuum deposition, for instance. Electrodes 22 and 23 are insulated from metallic body 17 and form the output electrodes of the generator. A load 25, indicating a power consuming device such as a light bulb, radio set, or the like, is connected between electrodes 22 and 23. Ferroelectric sheets 19 and 20 with their associated electrodes 21, 22 and 23, 24, respectively, form two capacitors hereinafter referred to as capacitors C3 and C4. Capacitors C3 and C4 are maintained in a charged condition by a battery 26 and a series resistor 27. Battery 26 is drained only by leakage currents. Series resistor 27 serves to attenuate alternating currents circulating through the battery. An alternating current output is developed cross load 25, by rotating member 17 about its axis of rotation 18, as shown by the arrow in FIG. 12, so that capacitors C3 and C4 are alternately exposed to radiated thermal energy indicated diagrammatically at 28, and to a heat sink to which thermal energy, absorbed in capacitors C3 and C4 radiates, shown diagrammatically at 29 in FIG. 12. The initial charge on condensers C3 and C4 is supplied by battery 26 and part of this charge is driven back and forth through the load as capacitors C3 and C4 are heated and cooled, in phase opposition, by alternately exposing them toward and away from source 28. It should be noted that the electrical energy dissipated in the load is derived from the absorption of thermal energy by capacitors C3 and C4, and not from the rotational energy of member 17, as in conventional electromagnetic generators.

Assuming now, as shown in FIG. 1, that the temperature may be cycled between the temperatures $T_c$ and $T_{c'}$, it is possible to indicate the action of the alternating current generator of FIG. 12.

In the region of the Curie temperature, $T_c$, the capacitor C4 accepts an electrical charge $$Q_c = C_c \cdot V_c$$

whereas capacitor C3 at the temperature $T_{c'}$ accepts $$Q_c = C_{c'} \cdot V_c$$

The difference of the two charges is $$Q_c - Q_{c'} = V_c(C_c - C_{c'})$$

This charge is forced back and forth through a load resistor twice during each temperature cycle. The average current will be $$I = 2f(Q_c - Q_{c'}) = 2fV_c(C_c - C_{c'})$$

where $f$ is the frequency of the temperature cycling or the frequency of the alternating current. The peak voltage under open circuit, or infinite load condition, derives from heating each capacitor from $T_c$ to $T_{c'}$. This voltage is $$V_p = V_c \cdot \frac{C_c}{C_{c'}} = V_c \frac{K_c}{K_{c'}}$$

From the above exposition, it is clear that a high rotational frequency $f$ is desired if a high average load current is to be obtained. For a given heat source 28, heat sink 29, and rotational frequency $f$, the efficiency of the device can be further increased by thermally isolating dielectric bodies 19 and 20, thereby decreasing their associated heat capacity or thermal inertia. It is desirable to use dielectric bodies as thin as permitted by dielectric strength requirements. A practical embodiment of this invention should utilize thin sheets of ferroelectric materials cemented to a rotating body which is a poor heat conductor. Since the heat transfer is accomplished by radiation, surface electrodes 21 and 24 should have a high absorption and emission coefficient.

The output current through load 25 of FIG. 12 is generally not in phase with the generator voltage since the generator impedance includes capacitive reactance. Generator voltage and load current will be in phase if the load is an inductor which meets the requirement:

$$\omega L = \frac{1}{\omega(C3 + C4)}$$

This is the resonant condition.

The energy absorption of a resistive load can be increased if a voltage dependent switching element such as a thyrite resistor or a back-to-back combination of Zener diodes is used in series with the load 25. Such an arrangement permits the flow of current only after a threshold (Zener) voltage has been surpassed. The current through the load becomes nonsinusoidal or peaked with an increased root-mean-square value even though the frequency of discharge cycles remains the same.

Figure 12A:
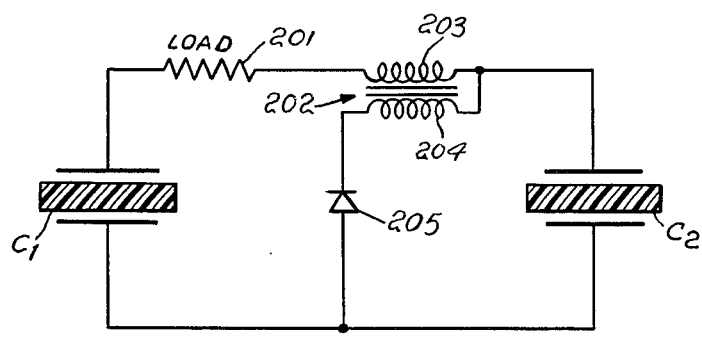
FIG. 12A is a schematic representation of energy conversion apparatus as in FIG. 12 but operating without a battery.

In FIG. 12a, an arrangement equivalent to that of FIG. 12 includes capacitive energy converting elements C1 and C2, previously "poled," in accordance with principles enunciated in the discussions of FIGURES 4 and 4a. This arrangement differs from that in FIG. 12 in that the battery 27 has been deleted, the bound charges in the "poled" capacitors providing initial "priming" energy, when heat is applied. Charges lost by leakage through the capacitive elements are replenished by means of a feedback arrangement including a transformer 202, having a primary winding 203, which also serves as an inductive load offsetting the capacitive phase shifts introduced by the converting elements, and a secondary winding 204, connected at one end thereof, to the common electrode of the two elements, through a limiting diode 205, and at the other end thereof, the noncommon terminal of one of the elements, C2. The secondary winding thereby serves as a feedback voltage generator, replenishing dissipated charges utilizing energy stored in the magnetic field of the primary winding.

The principle of the alternating current ferroelectric generator lends itself well to multiphase systems. FIG. 13 shows an example of a three phase ferroelectric generator. It differs from the generator of FIG. 12 in the manner in which the ferroelectric capacitors are mounted and in the techniques of heating and cooling. The rotating cylindrical body 30 has openings 31 which permit radiant energy 32 to enter the inside of cylindrical body 30 and heat up the ferroelectric capacitors 33 sequentially during rotation about an axis 34. Resistors 35 form the load of this three phase generator. Battery 36, as in FIG. 12, is used solely for priming purposes. As the capacitors 33 are alternately heated and cooled, by radiation of thermal energy from source 32 and to sink 37, respectively, the charge on the capacitor 33 is irradiated by source 32, is caused to circulate through its associated load resistor 35 and to divide equally between the two capacitors 33 which are not being directly heated by radiant energy from source 32 and are, therefore, at a lower potential. If the outer surfaces 38, of the capacitors 33, are made highly reflective, heating due to radiation on that surface can be minimized. The internal mounting of the capacitors 33 provides an advantage in that centrifugal force due to rotation presses the capacitors tightly against body 30, thereby permitting high rotational speeds. Also, in the arrangement of FIG. 13 the capacitors 33 are better protected from changes in ambient conditions particularly when openings 31 are covered with glass or quartz, for instance. Furthermore, in satellite and space applications, the capacitors 33 are thus provided with relatively good protection from micrometeorite collisions. The heat radiation from the capacitors 33, however, is not as good as in the case of FIG. 12. The embodiment of FIG. 13 is, of course, exemplary of only one application of the present invention to multiphase systems, and the principles enunciated herein may readily be extended to systems having five or more electrical phases per cycle of rotation.

The frequency of the output of ferroelectric generators is low due to the required transfer of thermal energy to and from bodies of low, but finite, mass. It is possible, however, utilizing frequency multipliers to obtain higher frequency outputs when the frequency multipliers are utilized in connection with multiphase systems such as the one shown in FIG. 13. An arrangement, however, which provides a higher frequency output without utilizing frequency multipliers is shown in FIG. 14.

In the embodiment of FIG. 14, the entire rotating member 40 consists of a ferroelectric material such as barium titanate. An outside electrode 41, with suitable high absorption or heat transfer characteristics covers the cylindrical or spherical barium titanate body 40. Inner electrodes 42 are connected through diodes 43 to a load resistor 48. With the polarity of the diodes as shown, it is advantageous to charge the internal electrodes 42 positively utilizing priming battery 45 which charges through Zener diodes 43. It should be clear that other configurations could be utilized, and the exposition of FIG. 14 is not intended to be a limitation on the scope of this invention. The peak operating voltages and the battery voltage are above the Zener voltage of the diodes 43. Opposite pairs of capacitors such as 46 and 47 are connected through two opposing Zener diodes 43 to a load 48. The diodes 43 narrow what would be a substantially sinusoidal discharge of one half cycle into a narrower pulse. After partial rotation of body 40, a pulse of opposite polarity flows through load 48. Thus, an alternating current is obtained which has a frequency N times the rotational frequency of the assembly where N is the number of capacitor pairs.

A more sinusoidal output may be obtained if thyrite resistors are used instead of the Zener diodes. Also, gas diodes may be substituted for the Zener diodes. In operation, the device of FIG. 14 is similar to that of the structures of FIGS. 12 and 13. Radiant thermal energy 49 impinges on capacitor 46 thereby increasing the temperature and the voltage across the condenser element. Capacitor 47, disposed in opposition to capacitor 46, is radiating thermal energy 50. As a result of the absorption and radiation of thermal energy and because its permittivity changes with temperature, capacitor 46 experiences an increase in voltage and condenser 47 experiences a corresponding decrease in voltage. A difference in potential, therefore, accrues between condensers 46 and 47, and when this difference exceeds the breakdown voltage of diode 43, a pulse of current is passed through load 48. It should be noted, at this point, that the discharge through load 48, between capacitors 47 and 46 takes place only when the proper difference in potential exists between the two condensers, as determined by the breakdown voltage of Zener diode 43.

It is obvious that the foregoing embodiments of an alternating current ferroelectric generator are given as examples and do not include all possible design variations. The design and choice of the ferroelectric material is highly dependent on the application and on the available temperature differentials. The Curie temperatures of presently known ferroelectric materials range from 15° K. for lead niobate to 840° K. for lead metaniobate. Potassium niobate is another high temperature material with a Curie point of approximately 700° K.

Also, so-called anti-ferroelectric materials, such as lead zirconate, are suitable because of their high gradient of permittivity versus temperature near the Curie point. It is also possible to operate ferroelectric power generators in subfreezing temperature ranges. A suitable material is Rochelle salt which changes its permittivity by a ratio of 400 to 1 when changing temperature from −20° C. to −80° C.

Power generators such as shown in FIGS. 12 through 14 lend themselves particularly well to applications where thermal energy is available in large quantities as, for example, solar energy. Thus, applications for thermal energy converters may be seen in desert regions where thermal energy, derived from solar radiation, is available for long periods of time, and in space applications where lightweight, relatively efficient energy converters are required.

Referring now to FIG. 15 another rearrangement of the circuitry of FIG. 4 which eliminates the need for consumed battery power, includes a storage battery 4, charging energy storage element 1 over a charging path including the holding diode 5. Upon application of thermal energy to element 1, the stored charge, at a higher voltage is fed over a discharging path, including diode 5' and load 6, back to storage battery 4. In this manner, the electrical charge Q is returned to the battery. The combination of load 6 and capacitor 16 is designed to provide a large RC time constant relative to the time of temperature cycling.

FIG. 16 shows still another way of eliminating the dissipation of battery power. In FIG. 16 battery 51 serves only to initially charge or "prime" a plurality of parallel connected converter capacitors 52, 53, 54 and to overcome leakage in these capacitor elements. A charging resistor 55 having a high value of resistance is utilized in series with battery 51 to prevent the discharge of output currents through battery 51. Converter capacitors 52, 53, and 54 are temperature cycled in such fashion that they are at different points of the cycle at a given instant. Assuming that capacitor 52 is at a relatively high temperature $T_c'$ and that capacitor 53 is at a relatively low temperature $T_c$, a discharge of capacitor 52 through diode 56, load 57 and a charging of capacitor 53 and/or 54 will take place due to the difference in potential which exists because of the difference in temperature between the capacitor elements. In the next step, capacitor 53 is discharged and capacitor 52 and/or 54 is charged. Diodes 58 prevent a direct distribution of charge from the capacitor being charged and force the charge, at a higher potential, to pass through load 57. Thus, the total charge is recirculated between the capacitors, resulting in a D.C. current through load 57 and no utilization of battery power except for the initial "priming" charge, and charges to replace losses due to leakage currents.

A practical application of an energy converter utilizing the scheme described in connection with FIG. 16 is provided in a water-borne float, or buoy, as shown in FIG. 17. The floating buoy 60 has several lenses 61 disposed on the surface of the buoy to collect solar radiation 62. Ferroelectric capacitors 63 are located in the focal planes of lenses 61 and are heated alternately as surface waves cause the buoy to oscillate or rotate. The capacitors not being heated at a particular instant are cooled by heat conduction to the water. The buoy can carry and power electronic equipment such as a radio or sonar transmitters. The design, however, has to assure that the center of gravity of the buoy is low enough so that the lens section will normally point upward. By utilizing the circuitry of FIG. 16 in connection with the arrangement shown in FIG. 17, it is possible to obtain a relatively high output power.

Extremely high voltages, as required, for example, in the operation of cathode ray tubes, may be obtained by cascading several stages of converter capacitors in such a fashion that the output voltage of a preceding stage is

19 utilized to charge the capacitor of a following stage. An arrangement which utilizes this technique for high voltage generation is shown in FIG. 18. FIG. 18 shows four converter capacitors 70, 71, 72 and 73 attached to a rotating cyclindrical or spherical body 74 which forms a common outer electrode for the aforementioned capacitors. The body 74 is heated by a source 75 at its topmost portion and cooled by a heat sink 76 to a relatively low temperature. In operation, battery 77 charges capacitor 70 through a high resistance charging resistor 78. Body 74 is thereupon rotated 90° so that capacitor 70 is heated by radiant energy 75 thereby increasing the voltage across capacitor 70 in proportion to the change in permittivity caused by heating. At this point, capacitor 70 is allowed to discharge through diode 80 into capacitor 71. Capacitor 71, it should be noted, has a greater thickness of dielectric than capacitor 70 to prevent breakdown because of the higher voltages across it and to decrease the capacity of capacitor 71. Since the charge being circulated remains constant, if the voltage is increased the capacity must decrease to compensate for the increase in voltage and this is accomplished in each of the capacitors by increasing the thickness of the dielectric in the succeeding capacitor. As body 74 is rotated about axis 81, capacitor 71 is heated and discharges through a diode into capacitor 72 which is in turn heated and discharged into capacitor 73. Capacitor 73, upon being heated, is charged to the highest voltage possible and this energy is discharged through load 79 which can be any utilization device such as a cathode ray tube or a particle accelerator. In this embodiment, the initial priming charge is recirculated upon discharge and no battery power is utilized other than the priming power and that utilized to make up for losses due to leakage currents. It should be noted that the "poling" principles previously discussed are readily applicable in this embodiment, as a means for eliminating the battery power required for initially priming the system electrically.

It should be noted that ferroelectric energy converting elements can be manufactured utilizing thin films for both the dielectric portion and for the metallic electrodes. This lightweight construction as well as the availability of thermal energy in space environment make such converters ideal for space applications and competitive with other power sources particularly where electrical power is required for long period of time.

While I have described above the principles of my invention in connection with specific apparatus, it is to be clearly understood that this description is made only by way of example and not as a limitation to the scope of my invention as set forth in the objects thereof and in the accompanying claims.

I claim:

1. An energy converter comprising an energy storage element having a given range of decreasing permittivities over a given increasing temperature range, means coupled to said element to store electrical charge thereon at a given point in said temperature range and at a given voltage, and means to subject said element to a source of heat to vary the thermal energy and permittivity of said element, and utilization means coupled to said elements to extract said charge at a voltage which is increased over said given voltage with an increase in said thermal energy.

2. An energy converter according to claim 1 wherein said element comprises two spaced electrodes and a dielectric medium disposed therebetween.

3. An energy converter according to claim 2 wherein said dielectric medium is barium titanate.

4. An energy converter according to claim 2 wherein said dielectric medium includes a liquid having a boiling point temperature lying in said given temperature range.

5. An energy converter according to claim 2 wherein said dielectric medium is a polarizable medium.

6. An energy converter comprising an energy storage element having a given range of decreasing permittivities over a given increasing temperature range, means coupled to said element to apply electrical charge thereto at a given point in said temperature range and at a given voltage, means to subject said element to a source of thermal energy, and means coupled to said element to extract said charge from said element at a voltage and permittivity respectively greater and less than said given voltage and permittivity when the temperature of said element is increased within said given range.

7. An energy converter according to claim 6 wherein said means coupled to said element to extract said charge includes means for extracting said charge in the form of alternating current.

8. An energy converter according to claim 6 wherein said means coupled to said element to extract said charge includes means for extracting said charge in the form of direct current.

9. An energy converter according to claim 6 wherein said means coupled to said element to apply electrical charge thereto includes a source of electrical power and a non-reciprocal element serially disposed between said source and said element to prevent said charge from discharging back into said source.

10. An energy converter according to claim 6 wherein said means coupled to said element to extract said charge includes a utilization device and a switching element serially disposed between said element and said utilization device to permit extraction of said charge when the voltage of said charge is greater than said given voltage.

11. An energy converter for association with a source of heat comprising an energy storage element having a given range of decreasing permittivities over a given increasing temperature range, means coupled to said element to apply electrical charge thereto at a given point in said temperature range and at a given voltage, means coupled to said element to extract said charge from said element at a voltage which increases with said increasing temperature range and permittivity which decreases therewith from said given voltage and permittivity when the temperature of said element is varied within said given range, and means to change the position of said element relative said heat source to vary the temperature of said element within said given range.

12. An energy converter according to claim 11 wherein said means to change the position of said element relative to said heat source includes a mechanical shutter interposed between said element and said heat source.

13. An energy converter for association with a source of heat comprising an energy storage element having a given range of decreasing permittivities over a given increasing temperature range, means coupled to said element to apply electrical charge thereto at a given point in said temperature range and at a given voltage, means coupled to said element to extract said charge from said element at a voltage which increases with said increasing temperature range and permittivity which decreases therewith from said given voltage and permittivity as the temperature of said element is varied within said given range, and means to expose said element alternately toward and away from said heat source to vary by absorption and radiation of thermal energy respectively, the temperature of said element within said given range.

14. An energy converter according to claim 13 wherein said means to expose said element toward and away from said heat source includes a rotatable member having said energy storage element disposed thereon and means to rotate said rotatable member from a region of high temperature to a region of low temperature.

15. An energy converter comprising an element having a permittivity range which decreases with an increasing temperature range, means coupled to said element for applying electrical charge thereto at a given voltage and temperature in said ranges, a source of thermal energy, means for subjecting said element to said source of thermal energy to decrease the permittivity of said element, means coupled to said element to extract said charge therefrom at a voltage which increases over said given voltage with said decreasing permittivity and at a temperature higher than said given temperature, and means to cool said element to absorb thermal energy therefrom to return said element to said given value of permittivity at said given temperature.

16. An energy converter for association with a source of thermal energy comprising an element having relatively high values of permittivity at relatively low temperatures and relatively low values of permittivity at relatively high temperature, means coupled to said element for applying electrical charge thereto at a given voltage at a relatively low temperature, means for subjecting said element to said source of thermal energy to decrease the permittivity of said element, means coupled to said element for extracting said charge therefrom at a voltage higher than said given voltage at a relatively low value of permittivity and at a relatively high temperature, and means to cool said element to absorb thermal energy therefrom to return said element to said relatively high value of permittivity at said relatively low temperature.

17. An energy converter comprising a ferroelectric storage element for association with a source of thermal energy having a relatively high value of permittivity at a relatively low temperature, means coupled to said element to apply electrical charge thereto at a given voltage at said relatively low temperature, means for subjecting said element to said source of thermal energy to decrease the permittivity of said element, means coupled to said element to extract said charge therefrom at a voltage higher than said given voltage at a relatively low value of permittivity and at a relatively high temperature, and means to effect a change in the thermal energy of said element to return said element to said relatively high value of permittivity at said relatively low temperature.

18. An energy converter comprising an element having a given value of permittivity at a given temperature in a range of permittivities which decreases with an increasing temperature range, means for applying electrical charge to said element at a given voltage at said given temperature, a first source of thermal energy coupled to said element to increase the temperature, said voltage increasing with an increasing temperature of said element to a temperature greater than said given temperature, a second source of thermal energy, means for subjecting said element to said second source of thermal energy to vary the permittivity of said element, means for extracting said charge from said element at a voltage greater than said given voltage, and with the permittivity and temperature of said element different from said given permittivity and temperature, and means to effect a change in the thermal energy of said element to return said element to said given value of permittivity at said given temperature.

19. An energy converter comprising a capacitive element having a range of decreasing permittivities over a given increasing temperature range and different values of specific heat in the charged and uncharged condition over said range of temperatures, the differences between said values increasing with increased temperature over at least a portion of said temperature range, means coupled to said element to apply electrical charge thereto at a given voltage and at a given temperature within said given temperature range to change the specific heat of said element from an uncharged value to a charged value, a source of thermal energy, means for subjecting said element to said source to vary the temperature of said element within said given temperature range while maintaining said element in a charged condition, means coupled to said element to extract said charge therefrom at a voltage different from said given voltage within said given temperature range to change the specific heat from a charged value to an uncharged value, and means to effect a change in the thermal energy of said element to vary the temperature of said element within said given temperature range while maintaining said element in an uncharged condition.

20. A ferroelectric energy converter comprising a ferroelectric element capable of storing an electric charge, said element having a given Curie temperature and a given permittivity at said Curie temperature, means coupled to said element to apply a given electric charge to said element, means to increase the temperature of said element in the region of its Curie temperature to vary said permittivity thereby varying the electrical energy stored in said element, and a utilization device coupled to said element responsive to energy variations in said given electric charge during said increase in the temperature of said element.

21. An energy converter comprising at least two energy storage elements having a given range of permittivities over a given temperature range, means coupled to said elements to apply electrical charge thereto at a given point in said given temperature range and at a given voltage, means coupled between said elements to bidirectionally transfer said charge between said elements at an increased voltage and with the permittivity of the element from which said charge is being transferred different from said given permittivity when the temperatures of said elements are varied within said given range, a heat source, a heat sink and means to expose each of said elements alternately to said heat source and said heat sink to alternately vary the temperatures of said elements within said given range.

22. An energy converter comprising at least two energy storage elements having a given range of permittivities over a given temperature range, means coupled to said elements to apply electrical charge thereto at a given point in said temperature range at a given voltage, means coupled to said elements to unidirectionally extract said charge therefrom at a voltage and permittivity different from said given voltage and permittivity when the temperatures of said elements are varied within said range, a heat source, a heat sink, and means to expose each of said elements alternately to said heat source and said heat sink to alternately vary the temperatures of said elements within said given range.

23. An energy converter comprising a plurality of energy storage elements having a given range of permittivities over a given temperature range, means coupled to said elements to apply electrical charge thereto at a given point in said temperature range and at a given voltage, means coupled to said elements to extract said charge therefrom at a voltage and permittivity respectively greater and less than said given voltage and permittivity as the temperature of said elements is varied within said given range, a heat source to apply thermal energy to said elements, and means to change the relative positions of said heat source and said elements to alternately vary the temperatures of said elements within said given range.

24. An energy converter according to claim 23, wherein said means coupled to said elements to extract said charge therefrom includes circuitry coupling said elements for passing said charge back and forth between said elements in the form of an alternating electrical current.

25. An energy converter according to claim 24 wherein said circuitry coupling said elements includes a common load and circuitry coupling each of said elements through said load to a common point for extracting multiphase alternating current therefrom.

26. An energy converter according to claim 22 wherein said means coupled to said elements to extract said charge therefrom includes circuitry with diodes serially disposed with reference to said elements for extracting direct current therefrom.

27. An energy converter for association with a source of heat and a heat sink, comprising a hollow rotatable body having a plurality of openings disposed on the surface thereof, a plurality of capacitive energy storage elements having a given range of permittivity over a given temperature range disposed internally of and on the inner surface of said body, each of said elements being disposed diametrically opposite one of said openings, a plurality of electrical loads, each of said loads being coupled between a common point and one of said elements, means coupled to said common point to apply an electrical charge at a given voltage through said loads to said elements, means to expose said elements alternately through their diametrically opposed openings to said heat source and to said heat sink to vary the potential difference of said elements with respect to said common point to permit successive discharge in opposite directions of said elements into said loads to provide an alternating current in each of said loads.

28. An energy converter for association with a source of heat and a heat sink comprising a plurality of pairs of energy storage elements, a hollow rotatable member having a circular cross-section, said pairs of elements being disposed in a given circumferential relationship with respect to each other on said member, circuitry coupled between the elements of each of said pairs of storage elements for circulating alternating current therebetween, means to charge each of said pairs of energy storage elements to a given voltage, said heat source and said heat sink being disposed on opposite sides of said member, means to rotate said member about a given axis to simultaneously expose one of said elements of each pair to said heat source while the other element of said pair is exposed to said heat sink to vary the voltage of said pairs of storage elements, and switching means in series with said circuitry to discharge the charges stored on said elements through said circuitry at a voltage higher than said given voltage.

29. A device according to claim 28 wherein said circuitry to provide a voltage higher than said given voltage includes a load, and certain of said pairs of elements coupled to said load to pass current in opposite directions through said load as said body is rotated.

30. An energy converter in association with a source of thermal energy comprising an energy storage element having a given range of permittivities over a given temperature range, a source of electrical energy to charge said element with a given charge at a given voltage, said element being coupled to said source over an associated charging path, a diode serially disposed in said charging path to allow only unidirectional flow of said charge therealong, an electrical load, said load being coupled between said element and said source over an associated series discharging path, a diode serially disposed in said discharging path to allow only unidirectional flow of said charge from said element through said load to said source, and means to alternately expose said element toward and away from said source of thermal energy to vary the voltage of said element from said given voltage.

31. An energy converter in association with a source of thermal energy comprising a plurality of energy storage elements having a given range of permittivities over a given temperature range, a source of electrical energy to charge each of said elements with a given charge, each of said elements being coupled to said source over an associated parallel charging path, an electrical load, each of said elements being coupled to said load over an associated parallel discharging path, means to expose each of said elements toward and away from said source of thermal energy at different instants of time to charge and discharge said elements through said load at corresponding different instants of time thereby circulating said given charge among said elements, and a plurality of diodes serially disposed in said charging and discharging paths to allow only unidirectional flow of said given charge in said paths.

32. An energy converter according to claim 31, wherein said means to expose each of said elements includes an oscillatory body having said elements disposed on the under surface thereof and a plurality of radiant energy concentrating members disposed in juxtaposition to said elements to concentrate thermal energy on different ones of said elements as said body oscillates.

33. An energy converter for association with a source of thermal energy comprising a series of energy storage elements having given values of permittivity over a given temperature range, each of said elements having a dielectric portion, each said dielectric portion having an increased thickness relative to the dielectric thickness of the preceding element, a source of electrical energy coupled in parallel relationship to each of said elements to charge each of said elements to a given value of voltage, a plurality of non-reciprocal switching elements, one of which is disposed between said source and each of said storage elements, means to successively expose each of said elements toward and away from said heat source such that the heated element discharges into the next succeeding element of increased dielectric thickness at a voltage higher than said given voltage through a non-reciprocal switching element disposed therebetween and an electrical load coupled between the storage element having the maximum dielectric thickness and the storage element having minimum dielectric thickness to transfer a relatively high voltage discharge therebetween as a result of said successive discharges through said series of elements.

34. A method of employing an element having a given range of decreasing permittivities over a given range of increasing temperatures for converting between energies in thermal and electrical form comprising the steps of applying electrical charge to said element at a given point in said temperature range and at a given voltage, subjecting said element to a source of heat to increase the thermal energy, decrease the permittivity of said element, and extracting said charge at a voltage which is increased over said given voltage with said increased thermal energy.

35. A method of employing an element having a given range of decreasing permittivities over a given range of increasing temperatures for converting energy between its thermal and electrical forms comprising the steps of applying electrical charge to said element at a given point in said temperature range and at a given voltage subjecting said element to a source of thermal energy to increase the thermal energy thereof and decrease the permittivity of said element, and extracting said charge from said element at a voltage which is increased over said given voltage with said increased thermal energy, and changing the relative positions of said heat source and said element to decrease the temperature of said element within said given range.

36. A method of employing an element having relatively high values of permittivity at relatively low temperatures and relatively low values of permittivity at relatively high temperatures for converting energy between its thermal and electrical forms comprising the steps of applying electrical charge to said element at a given voltage and at a relatively low temperature, subjecting said element to a source of thermal energy to increase the temperature thereof and decrease said relatively high value of permittivity to a relatively low value of permittivity, extracting said charge from said element at a voltage which increases with said increased temperature and is higher than said given voltage and at said relatively low value of permittivity, and cooling said element to decrease the temperature of said element to said relatively high value of permittivity at said relatively low temperature.

37. A method of employing a capacitive element having a permittivity range which decreases over an increasing temperature range and differences in specific heat between the charged and uncharged conditions over said temperature range for converting between energies in thermal and electrical form, said differences increasing with temperature over at least a portion of said temperature range, comprising applying electrical energy to said element at a given voltage within said given temperature range to change the specific heat from an uncharged value to a charged value subjecting said element to a source of thermal energy to vary the temperature of said element within said given temperature range while maintaining said element in a charged condition, extracting electrical energy from said element at a voltage different than said given voltage within said given temperature range to change the specific heat from a charged value to an uncharged value, and cooling said element to effect a change in the thermal energy of said element thereby varying the temperature of said element within said given temperature range while maintaining said element in an uncharged condition.

38. An energy converter comprising an energy converting element having distinct first and second values of permittivity associated therewith at respective first and second temperatures, said second value of permittivity being less than said first value, said second temperature being higher than said first temperature, said element further having a given electrical charge associated therewith at said first temperature, means for varying the temperature of said element over a temperature range including said first and second temperatures, utilization means, and means for transferring said associated charges from said element to said utilization means, said transferring means including means for inhibiting said charge transfer until the temperature of said element increases from said first to said second temperature, thereby enabling the transfer of said given charge at an increased voltage.

39. An energy converter as in claim 38 wherein said inhibiting means comprises a Zener diode and said given charge is maintained at a potential less than the breakdown potential of said diode when said element is at said first temperature.

40. An energy converter as in claim 38 wherein said inhibiting means comprises linear circuit elements providing, in combination with the impedance of said converting element, a circuit time constant which substantially inhibits the said charge transfer during said temperature variation.

41. An energy converter comprising an energy converting element having different first and second values of permittivity associated therewith at respective first and second temperatures, said element further having a given electrical charge at a given voltage associated therewith at said first temperature, means for varying the temperature of said element over a temperature range including said first and second temperatures, and utilization means coupled to said element, said utilization means including means for transferring said associated charge from said element to said utilization means, means for storing said transferred charges, and means for feeding back said stored charge to said element, said transfer means further including means for inhibiting said charge transfer from said element to said storing means until the temperature of said element increases from said first to said second temperature.

42. An energy converter comprising a plurality of energy storage elements having a given range of permittivities over a given temperature range, said elements further having a given electrical charge at a given voltage associated therewith at a given point in said temperature range, means for varying the temperature of each said element over said given temperature range, means coupled to said elements for receiving said associated charge therefrom, said receiving means including means for inhibiting the transfer of said charge during a given phase of said temperature variation.

43. A method of employing an element having a given range of decreasing permittivities over a given range of increasing temperatures, said element further having an electrical charge at a given voltage associated therewith at a given temperature in said range, said voltage increasing with said increasing temperature, comprising the steps of heating said element to vary the temperature thereof over said temperature range, inhibiting the utilization of said charge until said given voltage has increased, and thereafter utilizing said charge at said increased voltage.

References Cited by the Examiner

UNITED STATES PATENTS

| 2,881,384 | 4/1959 | Durant | 322—2 |
| 2,915,652 | 12/1959 | Hatsopoulos et al. | 322—2 |

FOREIGN PATENTS 838,933  5/1952  Germany.

LLOYD McCOLLUM, *Primary Examiner.*

R. C. SIMS, A. H. TISCHER, *Assistant Examiners.*